US011850983B2

(12) United States Patent
Boehm et al.

(10) Patent No.: US 11,850,983 B2
(45) Date of Patent: Dec. 26, 2023

(54) METHOD FOR PRODUCING A SEAT COVER FOR A VEHICLE SEAT MADE OF A FORM-FIT KNIT PART

(71) Applicants: Bayerische Motoren Werke Aktiengesellschaft, Munich (DE); AUNDE Achter & Ebels GmbH, Moenchengladbach (DE)

(72) Inventors: Heinz Boehm, Gerolsbach (DE); Ngoc Bui Anh, Munich (DE); Peter Bolten, Moenchengladbach (DE); Roland Keubler, Moenchengladbach (DE)

(73) Assignees: Bayerische Motoren Werke Aktiengesellschaft, Munich (DE); AUNDE Achter & Ebels GmbH, Moenchengladbach (DE)

( * ) Notice: Subject to any disclaimer, the term of this patent is extended or adjusted under 35 U.S.C. 154(b) by 305 days.

(21) Appl. No.: 17/280,508

(22) PCT Filed: Jun. 27, 2019

(86) PCT No.: PCT/EP2019/067158
§ 371 (c)(1),
(2) Date: Mar. 26, 2021

(87) PCT Pub. No.: WO2020/064157
PCT Pub. Date: Apr. 2, 2020

(65) Prior Publication Data
US 2022/0041082 A1 Feb. 10, 2022

(30) Foreign Application Priority Data
Sep. 27, 2018 (DE) .................... 10 2018 216 535.1

(51) Int. Cl.
| B29C 51/00 | (2006.01) |
| B29C 51/42 | (2006.01) |
| B60N 2/58 | (2006.01) |
| B29C 70/24 | (2006.01) |
| B29C 70/34 | (2006.01) |
| B29C 70/46 | (2006.01) |
| D04B 1/16 | (2006.01) |

(52) U.S. Cl.
CPC ............ B60N 2/5891 (2013.01); B29C 70/24 (2013.01); B29C 70/347 (2013.01); B29C 70/465 (2013.01); D04B 1/16 (2013.01); *D10B 2401/041* (2013.01); *D10B 2505/08* (2013.01); *D10B 2505/12* (2013.01)

(58) Field of Classification Search
CPC ..... B29C 70/24; B29C 70/465; B29C 70/347; B29C 70/18; B29C 51/424; B29C 51/004
See application file for complete search history.

(56) References Cited

U.S. PATENT DOCUMENTS

| 3,627,608 | A | * | 12/1971 | Steiner .................... B27D 1/08 264/156 |
| 3,891,378 | A | * | 6/1975 | Belmuth ................ A41C 5/005 425/398 |
| 3,943,215 | A | * | 3/1976 | Grune .................. B29C 44/143 264/553 |
| 4,046,611 | A | * | 9/1977 | Sanson ................... B29C 69/02 425/169 |
| 4,660,888 | A | * | 4/1987 | Urai ....................... A47C 31/11 297/218.4 |
| 5,079,074 | A | * | 1/1992 | Steagall ................. B32B 27/36 428/218 |
| 6,103,180 | A | * | 8/2000 | Haeseker ............. D04H 1/4291 264/37.17 |
| 2012/0234051 | A1 | | 9/2012 | Huffa |
| 2015/0225518 | A1 | * | 8/2015 | Cinquemani .......... B29B 11/16 524/584 |
| 2019/0283346 | A1 | * | 9/2019 | Le Meur ............... B29C 51/004 |

FOREIGN PATENT DOCUMENTS

| DE | 197 21 370 A1 | 11/1998 |
| DE | 198 55 542 A1 | 6/2000 |
| DE | 20 2012 013 120 U1 | 12/2014 |
| EP | 0 133 893 A2 | 3/1985 |
| EP | 3 238 986 A1 | 11/2017 |
| WO | WO 2010/053937 A1 | 5/2010 |

OTHER PUBLICATIONS

International Search Report (PCT/ISA/210) issued in PCT Application No. PCT/EP2019/067158 dated Oct. 8, 2019 with English translation (five (5) pages).
German-language Written Opinion (PCT/ISA/237) issued in PCT Application No. PCT/EP2019/067158 dated Oct. 8, 2019 (seven (7) pages).

* cited by examiner

*Primary Examiner* — Matthew J Daniels
(74) *Attorney, Agent, or Firm* — Crowell & Moring LLP

(57) ABSTRACT

A method produces a seat cover for a vehicle seat made of a form-fit knit part. The form-fit knit part has continuous fibers and reinforcing fibers, and each of the reinforcing fibers is made of a core fiber and a cladding fiber coaxially sheathing the core fiber. The form-fit knit part is first produced using a knitting machine, and the seat cover is subsequently produced from the form-fit knit part using an ironing machine. The ironing machine has at least one lower mold in the shape of the vehicle seat, and the core fiber has a higher melting point than the cladding fiber.

9 Claims, No Drawings

METHOD FOR PRODUCING A SEAT COVER FOR A VEHICLE SEAT MADE OF A FORM-FIT KNIT PART

BACKGROUND AND SUMMARY OF THE INVENTION

The invention relates to a method for producing a seat cover for a vehicle seat made of a form-fit knit part.

In the prior art, textile seat covers are made of cut parts. The production of the cut part here goes through the process step of punching, sewing, padding. These process steps, in particular the process step of sewing, are very complicated and time- and material-consuming.

This process can be improved by knitting the seat covers. However, the disadvantage here is that knitted seat covers are very susceptible to stress due to their lower Velcro stability and abrasion resistance. Introducing additives in a washing process, as for rolled goods, is not possible in knitting technology. In the prior art, reinforcing fibers made of two components with different melting points are used for shaping or fastening of a meshwork. DE 197 21 370 A1, for example, discloses a method for producing a continuous meshwork material with heat-melting matrix fibers contained therein for use in batteries. However, this material is not suitable for producing a car seat.

Therefore, the aim of the present invention is to provide a method for producing a seat cover for a vehicle seat, which optimizes the method for producing a molded seat cover and at the same time ensures sufficient Velcro stability of the seat cover.

The aim is achieved by the combination of features according to the independent claim.

DETAILED DESCRIPTION OF PREFERRED EMBODIMENTS

A method is provided for producing a seat cover for a vehicle seat, which is made of a form-fit knit part. The form-fit knit part comprises continuous fibers and reinforcing fibers. Here, each of the reinforcing fibers is made of a core fiber and a cladding fiber coaxially sheathing the core fiber. The form-fit knit part is first produced using a knitting machine, and subsequently the seat cover is produced from the form-fit knit part using an ironing machine. Furthermore, the ironing machine comprises at least one lower mold in the shape of a vehicle seat, and the core fiber has a higher melting point than the cladding fiber. The method comprises the following steps:
a. knitting the three-dimensional form-fit knit part into the shape of the seat cover to be produced using the knitting machine from the continuous fibers and the reinforcing fibers,
b. stretching the form-fit knit part having the shape of the seat cover over the lower mold of the ironing machine,
c. heating the form-fit knit part using the ironing machine to produce the seat cover, wherein a temperature acting on the form-fit knit part is above the melting point of the cladding fiber and below the melting point of the core fiber.

The advantage of this method is that the corresponding form-fit knit part is knitted into the final three-dimensional shape of the seat cover during production. Seat covers made of flat material are produced in the prior art from flat material which must first be given the corresponding shape of the seat cover by punching and sewing. According to the invention, these two production steps are dispensed with, since the form-fit knit parts are produced by adding and removing stitches using a flat knitting machine. The result is a three-dimensional form-fit knit part with bulging areas due to stitching excess which corresponds to the shape of the corresponding car seat. Since the abrasion resistance/Velcro stability represents a critical requirement for knitted textiles, when knitting with the flat knitting machine, the reinforcing fibers, in addition to the continuous fibers, are introduced into the form-fit knit part. In the process, the reinforcing fibers are evenly distributed over the form-fit knit part. Furthermore, configurations are also possible which have a concentration of the reinforcing fibers at certain positions of the form-fit knit part, for example, positions in which the sensitivity to Velcro is high.

In the reinforcing fiber, it is advantageous if the core fiber has a higher melting point than the cladding fiber. As a result, only the cladding fiber melts in step c, while the core fiber retains its solid structure. Following step c, the melted cladding fibers cool down again, whereby the continuous fibers adhere to and fasten the reinforcing fibers and are fastened. In this manner, the sensitivity to Velcro of the individual fiber is minimized. Since the lower mold of the ironing machine has the shape of the corresponding vehicle seat and since the heating takes place on this lower mold, the form-fit knit part likewise retains this shape after gluing or melting of the reinforcing fibers to the continuous fibers. The maintenance of this shape is promoted by the stability of the core fibers.

In an advantageous embodiment variant it is provided that an outer surface of the lower mold, which in steps b and c directly adjoins the form-fit knit part, is air- and vapor-permeable.

Another advantageous embodiment example is one in which the ironing machine has an upper mold, and an outer surface of the upper mold, which in steps b and c directly adjoins the form-fit knit part, is air and vapor permeable.

In an advantageous variant, it is provided according to the invention that the heating in step c occurs by means of steam.

Preferably, in the method, the steam in step c is conveyed through at least the air-permeable outer surface of the lower mold onto the form-fit knit part.

Due to the air- and vapor-permeable outer surface, the ironing machine is capable of guiding the steam onto the form-fit knit part. Here, the steam is conveyed from the interior of the lower mold or the upper mold via the air- and vapor-permeable outer mold onto the form-fit knit part. Consequently, the continuous fibers and reinforcing fibers are heated to the temperature above the melting point of the cladding fiber and below the melting point of the core fiber.

In an embodiment example of the method, it is provided that, after step b, the form-fit knit part is fastened to the lower mold with needle plates extending around the lower mold. This is an advantageous method for fastening the form-fit knit part on the lower mold, since needle plates are particularly suitable for being integrated in the lower mold and for stretching the form-fit knit part over the lower mold.

In an additional advantageous variant, it is provided according to the invention that the reinforcing fibers are heated in step c until they adhere to the continuous fibers of the form-fit knit part at positions at which they overlap the continuous fibers.

Furthermore, it is advantageous if the core fibers and the cladding fibers each consist of polyester.

In a preferred embodiment of the method, the reinforcing fibers have a greater stiffness than the continuous fibers.

Accordingly, the reinforcing fibers stabilize the form-fit knit part and enable the maintenance of the shape of the corresponding vehicle seat.

In a variant of the present method, it is moreover provided that a melting point of the core fibers is above 110° C. Since this temperature represents a limit value which is not exceeded under usual operating conditions of a vehicle, it is thus ensured that the form-fit knit part is not heated in the vehicle to temperatures above this limit value. In this manner, it is ensured that the reinforcing fibers retain their shape and that the form-fit knit part does not undergo deformation due to temperature influences in the vehicle.

Other advantageous developments of the invention are characterized in the dependent claims. In its embodiment, the invention is not limited to the above-indicated preferred embodiment examples. Instead, numerous variants are conceivable, which use the represented solution even in embodiments of fundamentally different type.

What is claimed is:

1. A method for producing a seat cover for a vehicle seat made of a form-fit knit part, the method comprising the steps of:
    a) knitting, via a knitting machine, a three-dimensional form-fit knit part into a shape of the seat cover to be produced, wherein the form-fit knit part comprises continuous fibers and reinforcing fibers and the reinforcing fibers in each case are made of a core fiber and a cladding fiber coaxially sheathing the core fiber, and wherein the core fiber has a higher melting point than the cladding fiber;
    b) stretching the form-fit knit part having the shape of the seat cover over a lower mold of an ironing machine, wherein the ironing machine comprises the lower mold in the shape of the vehicle seat; and
    c) heating the form-fit knit part using the ironing machine to produce the seat cover, wherein a temperature acting on the form-fit knit part is above the melting point of the cladding fiber and below the melting point of the core fiber
    wherein the reinforcing fibers have a greater stiffness than the continuous fibers.

2. The method according to claim 1, wherein an outer surface of the lower mold, which directly adjoins the form-fit knit part in steps (b) and (c) is air- and vapor-permeable.

3. The method according to claim 2, wherein
the ironing machine has an upper mold, and
an outer surface of the upper mold, which directly adjoins the form-fit knit part in steps (b) and (c) is air- and vapor-permeable.

4. The method according to claim 1, wherein
the heating in step (c) occurs via steam.

5. The method according to claim 4, wherein,
in step (c), the steam is conveyed through at least the air-permeable outer surface of the lower mold onto the form-fit knit part.

6. The method according to claim 1, wherein,
after step (b), the form-fit knit part is fastened with needle plates to the lower mold.

7. The method according to claim 1, wherein,
in step (c), the reinforcing fibers are heated until the reinforcing fibers adhere to the continuous fibers of the form-fit knit part at positions at which the continuous fibers overlap.

8. The method according to claim 1, wherein
the core fiber and the cladding fiber each are made of polyester.

9. The method according to claim 1, wherein
a melting point of the core fibers is above 110° C.

* * * * *